US008973717B2

(12) United States Patent
Bae (10) Patent No.: US 8,973,717 B2
(45) Date of Patent: Mar. 10, 2015

(54) ROPE BRAKING APPARATUS

(76) Inventor: Hoo-Geun Bae, Incheon (KR)

( * ) Notice: Subject to any disclaimer, the term of this patent is extended or adjusted under 35 U.S.C. 154(b) by 58 days.

(21) Appl. No.: 13/817,281

(22) PCT Filed: Aug. 16, 2011

(86) PCT No.: PCT/KR2011/005998
§ 371 (c)(1),
(2), (4) Date: Feb. 15, 2013

(87) PCT Pub. No.: WO2012/023778
PCT Pub. Date: Feb. 23, 2012

(65) Prior Publication Data
US 2013/0140113 A1    Jun. 6, 2013

(30) Foreign Application Priority Data

Aug. 17, 2010   (KR) ........................ 10-2010-0079331

(51) Int. Cl.
| | | |
|---|---|---|
| B65H 59/16 | (2006.01) | |
| F16D 63/00 | (2006.01) | |
| B66B 5/18 | (2006.01) | |
| B66B 5/24 | (2006.01) | |
| B66C 15/02 | (2006.01) | |
| B66D 5/16 | (2006.01) | |

(52) U.S. Cl.
CPC .............. *F16D 63/008* (2013.01); *B66B 5/185* (2013.01); *B66B 5/24* (2013.01); *B66C 15/02* (2013.01); *B66D 5/16* (2013.01)
USPC ........... 188/65.1; 188/65.2; 188/188; 188/67; 187/350

(58) Field of Classification Search
USPC .......... 188/65.1, 65.2, 67, 171, 188; 187/350; 254/256–259
See application file for complete search history.

(56) References Cited

U.S. PATENT DOCUMENTS

| | | | | |
|---|---|---|---|---|
| 5,101,937 A | * | 4/1992 | Burrell et al. ................. | 187/350 |
| 5,228,540 A | * | 7/1993 | Glaser ........................... | 187/355 |
| 7,287,627 B2 | * | 10/2007 | Eckenstein et al. ........... | 188/137 |
| 8,256,579 B2 | * | 9/2012 | Jia ................................. | 187/350 |
| 8,511,437 B2 | * | 8/2013 | Glaser ........................... | 188/65.2 |

FOREIGN PATENT DOCUMENTS

| | | |
|---|---|---|
| KR | 20-0250559 Y1 | 11/2001 |
| KR | 10-2002-0031650 A | 5/2002 |
| KR | 10-0451818 B1 | 10/2004 |
| KR | 10-2005-0102791 A | 10/2005 |
| KR | 10-0643909 B1 | 11/2006 |
| KR | 10-2008-0099973 A | 11/2008 |

OTHER PUBLICATIONS

International Search Report for PCT/KR2011/005998 mailed Feb. 6, 2012 from Korean Intellectual Property Office.

* cited by examiner

*Primary Examiner* — Thomas J Williams
*Assistant Examiner* — Mariano Sy
(74) *Attorney, Agent, or Firm* — Sherr & Jiang, PLLC (57) ABSTRACT

The present invention relates to an elevator wire rope braking apparatus, and more particularly, to a rope braking apparatus which prevents partial abrasion of the wire rope while increasing braking efficiency by preventing a deviation in the pressure applied to the wire rope by a pressure plate moving in a straight line to apply pressure to the wire rope. Since the pressure application is based not on a hydraulic method but on a purely mechanical structure using only a spring elastic force, environmental pollution caused by hydraulic oil may be prevented and product cost may be reduced.

11 Claims, 11 Drawing Sheets

ROPE BRAKING APPARATUS

CROSS REFERENCE TO PRIOR APPLICATION

This application is a National Stage Patent Application of PCT International Patent Application No. PCT/KR2011/005998 (filed on Aug. 16, 2011) under 35 U.S.C. §371, which claims priority to Korean Patent Application No. 10-2010-0079331 (filed on Aug. 17, 2010), which are all hereby incorporated by reference in their entirety.

TECHNICAL FIELD

The present invention relates to a rope braking apparatus for pressurizing a wire rope during emergency braking in a hoist, a crane hoist, or an elevator, which is used to lift and lower an object tied to the wire rope.

BACKGROUND ART

An elevator used in a general building includes a winding machine installed on the building, a cage for carrying people, and a wire rope connecting the winding machine and the cage so that the cage is lifted or lowered by winding or unwinding the wire rope.

Such an elevator is provided with a braking apparatus, which is used when the cage needs emergency braking in an emergency.

The braking apparatus is installed on the cage and is configured to grasp the main rope, when emergency braking is needed, to prevent the cage from moving.

There have been extensive research and development on such rope braking apparatuses in line with stricter regulations for preventing accidents related to elevators, but most of such braking apparatuses, which usually employ a combination of hydraulic or pneumatic pressure and elastic force from springs, have problems in that the braking force may be degraded by leakage of the fluid, when hydraulic pressure is used, requiring frequent checkup of the hydraulic or pneumatic pressure.

Braking apparatuses have recently been proposed, which do not employ any hydraulic or pneumatic structure, but solely use elastic force from springs.

Examples of such braking apparatuses include Korean Patent Registration No. 0609836, entitled "Rope Braking Device for Elevator" and Korean Utility Model Laid-Open No. 2008-3368, entitled "Rope Locking Device of the Rope Brake for Elevator".

Such conventional apparatuses share the following operation scheme: a separate operation panel is connected to a rope pressurization plate and a compression spring via a link mechanism, and expansion of the spring causes rotation the operation panel and then movement of the pressurization plate, which pressurizes the rope.

Although the problem of fluid leakage can be solved, the following problem still exists.

When the pressurization plate is configured to pressurize the rope as a result of rotation of the operation panel as described above, the pressurization plate does not move along a straight line, but pivots along the trajectory of rotation of the operation panel to apply pressure. Therefore, the direction of pressure applied by the pressurization plate is not perpendicular but oblique to the rope.

As a result, there is a difference between a pressure applied to the upper portion of the rope and a pressure applied to its lower portion, making the braking force unstable, and there is also a possibility that friction force will be concentrated at a specific location on the rope, which may cause uneven wear of the rope or even cause the rope to break up.

SUMMARY OF INVENTION

Technical Problem

The present invention has been proposed in order to solve the above-mentioned problems of the prior art, and is directed to provide a rope braking apparatus capable of solving the problems of degradation of braking force resulting from leakage of a fluid, environmental contamination resulting from use of the fluid, and the like. The present invention is also directed to provide a rope braking apparatus capable of preventing occurrence of deviation of applied pressure and uneven wear of the rope by improving the structure of operation of the pressurization plate.

Solution to Problem

A rope braking apparatus according to an embodiment of the present invention, which has been proposed in order to accomplish the above-mentioned object, includes: an installation body including a wire rope positioned on a back surface, the wire rope being connected to a lifted/lowered object; a driving unit including a driving motor installed on the installation body, a transfer block unit installed to be movable upwards/downwards while being connected to the driving motor, and elastic members installed on the transfer block unit; a pressurization unit including a movable unit installed on the installation body so as to be movable forwards/backwards along a straight line while contacting the transfer block unit and a pressurization plate positioned to face the installation body, with the wire rope interposed, while being connected to the movable unit; and a movement control unit having an end removably connected to the movable unit.

In addition, the driving unit may further include a lead screw connected to the driving motor, the leading screw having a non-threaded portion formed on an upper end and a threaded portion formed in a section below the non-threaded portion; and a driving block unit screw-coupled on the threaded portion of the lead screw so as to be movable upwards/downwards while being positioned below the transfer block unit. In addition, the transfer block unit may include a connection block movable upwards/downwards without contacting the lead screw while being penetrated by the lead screw; and coupling blocks connected to both sides of the connection block, the elastic members being seated on the coupling blocks, and ends of the coupling blocks being placed on the movable unit. In addition, the rope braking apparatus may further include a first guide unit formed on at least one of the connection block and the coupling blocks; and a second guide unit formed on the installation body and connected to the first guide unit, the second guide unit being formed along a direction of upward/downward movement of the transfer block unit. In addition, slide recesses may be formed on both sides of the installation body along a forward/backward straight line, and the movable unit may include movable panels installed to be movable along the forward/backward straight line along slide recess paths while being installed in the slide recesses, an end of each movable panel being connected to the pressurization plate; and a connection rod positioned between respective movable panels, both ends of the connection rod being connected to respective movable panels, and the ends of the coupling blocks being placed on the connection rod. In addition, the connection rod may be connected to the movable panels so as to be rotatable by itself, and engagement latches may be formed on the ends of the coupling blocks so as to surround a circumference of the connection rod. In addition, the pressurization unit may further include a fixing block installed on the connection rod and removably connected to the movement control unit. In addition, the pressurization unit may further include a control block installed on the fixing block, a cut-away portion being formed on a side of the control block so that the control block is removably coupled to the solenoid unit through the cut-away portion. In addition, the movement control unit may include a solenoid body positioned beneath the connection rod; and a solenoid shaft installed to be movable upwards/downwards while being connected to the solenoid body, an end of the solenoid shaft being removably inserted into the cut-away portion. In addition, the movement control unit may further include a position detection sensor connected to the solenoid body and configured to detect a completed movement of the movable unit towards the pressurization plate. In addition, the movement control unit may further include a second position detection sensor connected to the driving motor and installed at a descending location of the driving block unit to detect a descending state of the driving block unit.

Advantageous Effects of Invention

Various embodiments of the prevent invention are advantageous in that pressurization of the wire rope solely by elastic force from elastic members, without using any hydraulic or pneumatic structure, solves the problems of degradation of braking force resulting from leakage of a fluid, environmental contamination resulting from use of the fluid, and the like. Furthermore, the structure of the pressurization unit itself and the structure of connection with the driving unit guarantee that the pressurization plate always moves along a straight line and pressurizes the rope, so that the pressure is applied across the entire pressurization plate, thereby securing stable braking force and preventing uneven wear of the wire rope.

DESCRIPTION OF EMBODIMENTS

Hereinafter, embodiments of the present invention will be described in detail with reference to the accompanying drawings so that those skilled in the art pertaining to the present invention can easily practice it. However, the present invention can be implemented in a number of different forms, and is not limited to the embodiments described below. The same components are given the same reference numerals throughout the description.

The rope braking apparatus according to the present invention includes, as illustrated in FIGS. 1 to 7, an installation body 100, a driving unit 200, a pressurization unit 300, and a movement control unit 400.

The installation body 100 serves as an overall case according to the present invention, which has an overall shape of a quadrangular box, and, more specifically, has lateral plates 120 installed on both sides of a rear plate 110 so that an installation space 130 is defined therein.

Both lateral plates 120 include fixing frames 140 coupled thereto, respectively, which are installed on a cage (not illustrated) of an object, which is carried by the wire rope, such as an elevator. The fixing frames 140 have guide holes 142 formed therein, respectively, so that the angle of both lateral plates 120 can be modified along the range of formation of the guide holes 142.

The guide holes can be omitted if adjustment of angle of both lateral plates 120 is unnecessary.

Both lateral plates 120 have slide recesses 122 formed at intermediate locations, respectively, which serve as paths of movement of movable panels 312 (described later), and respective upper ends of both lateral plates 120 are interconnected via a cover plate 150.

Both lateral plates 120 include fixing plates 124 installed on lower inner surfaces, respectively, in order to install second guide rods 240 (described later).

The rear plate 110 has a first seating recess 112, which has a semi-circular or V-shaped sectional structure, formed on its back surface along the upward/downward longitudinal direction of the rear plate 110, and half the sectional area of the wire rope R is inserted into the first seating recess 112.

First guide rods 114 are formed in the periphery of the first seating recess 112, in order to guide the movement of a pressurization plate 320 (described later), and are provided with shock-absorbing springs 115 so as to prevent collision between the pressurization plate 320 and the rear plate 110, in the process of pressurizing the wire rope R, and to automatically return the pressurization plate 320 to its location.

The rear plate 110 has an installation plate 116 formed at an intermediate location on its inner surface, in order to install a driving motor 210 (described later), and stick-shaped first guide units 117 are installed as rails on both sides of the installation plate 116, respectively, so as to guide the path during upward/downward movements of a driving block unit 250 (described later).

A transfer rail 118 is formed between both rail sticks 117 on the inner surface of the rear plate 110 along the upward/downward longitudinal direction so as to serve as a path of upward/downward movements of the driving block unit 250 (described later).

A driving unit 200 is installed on the installation body 100.

The driving unit 200 is configured to generate pressure applied to the wire rope R, and includes a driving motor 210, a lead screw 220, a transfer block unit 230, a driving block unit 250, and elastic members 260.

The driving motor 210 is configured to generate force for compressing the elastic members 260 (described later), and generally consists of a DC motor or an AC motor, to which a reducer is connected, and the lead screw 220 is connected to the motor shaft (not illustrated).

The driving motor 210 is seated and installed on the installation plate 116 so that the lead screw 220 faces downwards.

The lead screw 220 has non-threaded sections 222 formed in predetermined upper and lower sections, where no threaded portion is formed, and a threaded portion 224 formed between the non-threaded sections 222.

The transfer block unit 230, which constitutes the driving unit 200 together with the driving motor 210, is configured to transfer elastic force from the elastic members 260 (described later) to the pressurization unit 300, and includes a connection block 232 and coupling blocks 234.

The connection block 232, which is a part of the transfer block unit 230 making direct coupling with the lead screw 220, has the shape of a simple quadrangular block and has a first through-hole 232a formed at an intermediate location with a diameter larger than that of the lead screw 220.

The connection block 232 is installed on the lead screw 220 so that the lead screw 220 extends through the first through-hole 232a, and the connection block 232 is positioned on the upper non-threaded section 222 of the lead screw 220.

The first through-hole 232a has a diameter larger than that of the threaded portion 224 of the lead screw 220, as described above, so that no direct contact with the lead screw 220 occurs when the connection block 232 moves upwards/downwards along the longitudinal direction of the lead screw 220 later.

The coupling blocks 234 are configured to directly connect to and separate from the pressurization unit 300 (described later), in the process of delivering driving force to the pressurization unit 300, and have the shape of quadrangular blocks. Second through-holes 234a extend through the upper surfaces of the couplings blocks 234 in the upward/downward direction, respectively. Elastic members 260 are seated on the coupling blocks 234, respectively. The coupling blocks 234 may have arcs of a mechanical structure formed on front surfaces, respectively, so that a predetermined level of force can be maintained or multiplied in response to reduction of elastic force from the elastic members 260.

The coupling blocks 234 are positioned on both sides of the connection block 232 and are integrally connected to both lateral surfaces of the connection block 232.

Figure 1:
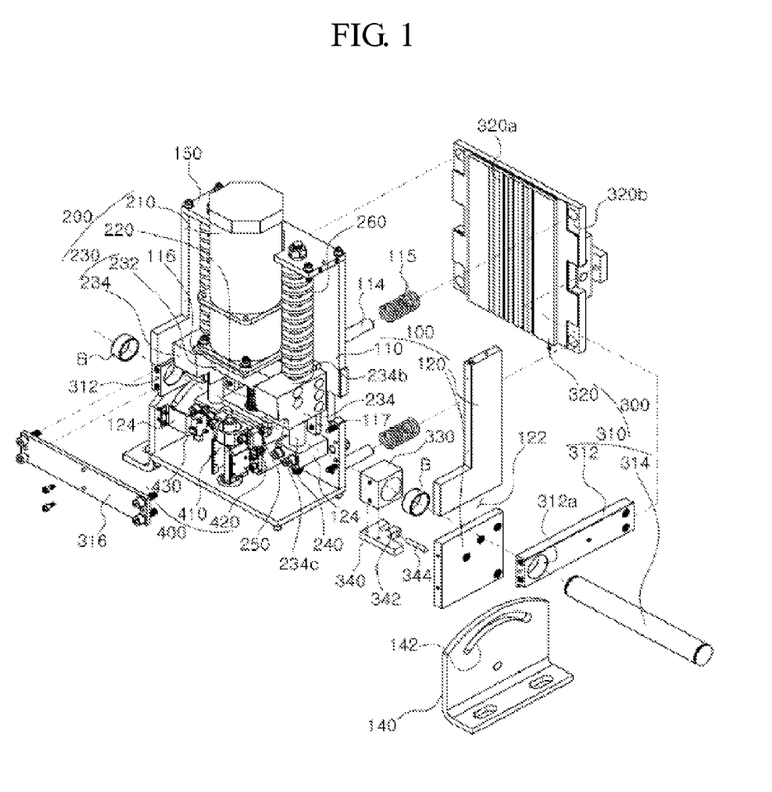
FIG. 1 is an overall exploded perspective view.
Figure 2:
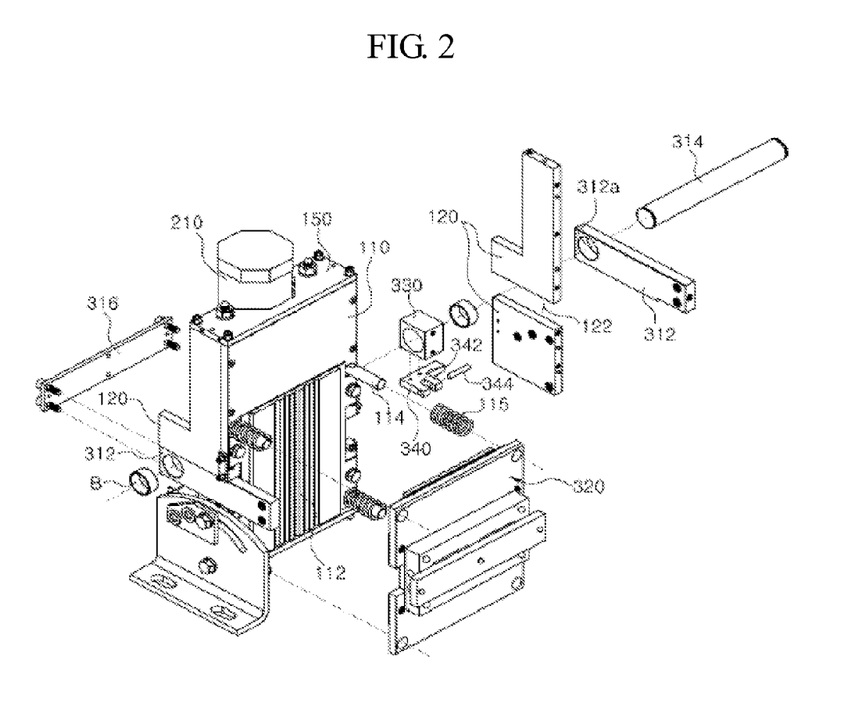
FIG. 2 is an exploded perspective view seen from the opposite direction.
Figure 3:
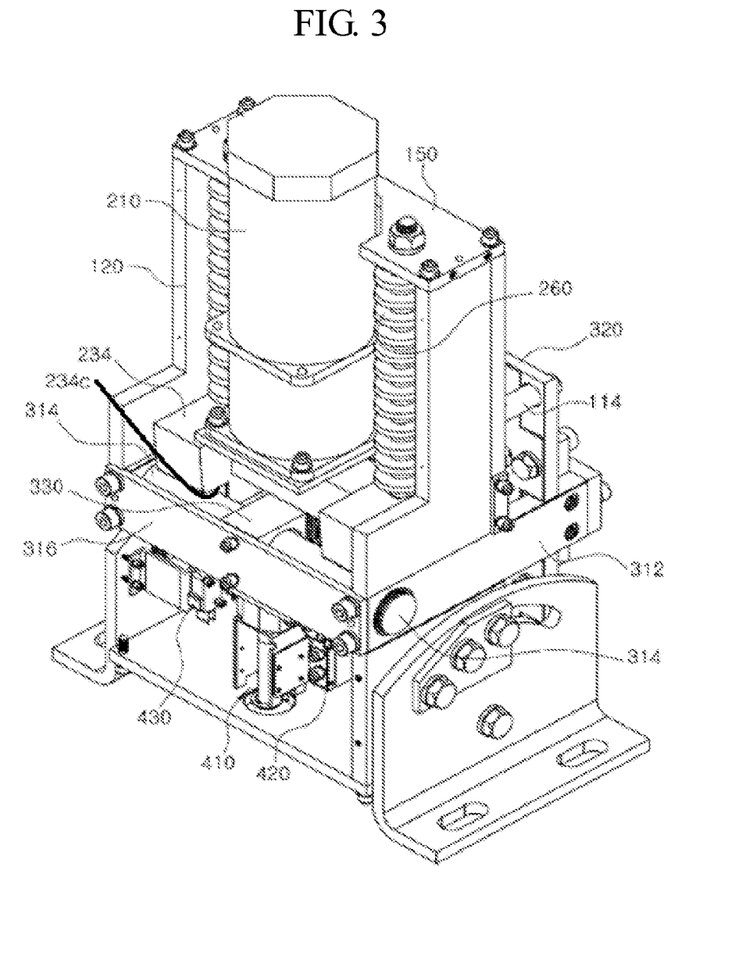
FIG. 3 is an overall assembled perspective view.
Figure 4:
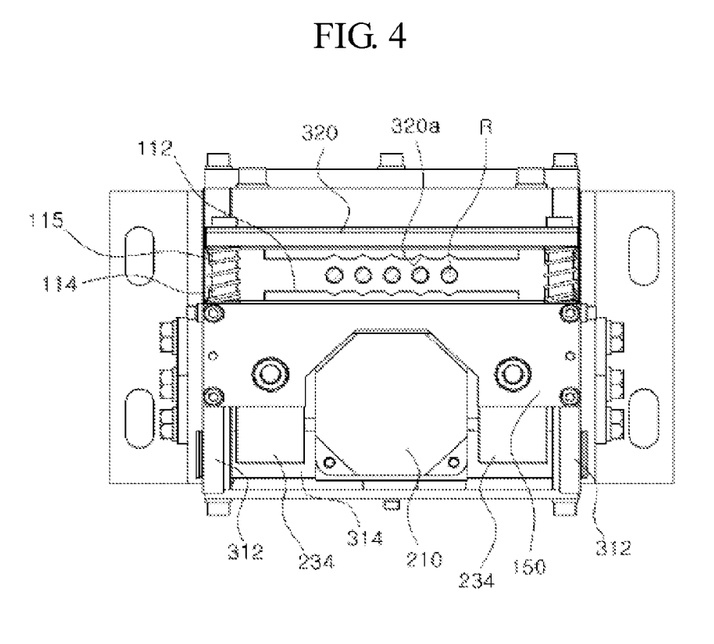
FIG. 4 is a top view when the rope is not pressurized.

The coupling blocks 234 include second guide units 234b formed as recesses on their back surfaces, respectively, and the first guide units 117 of the installation body 100 are inserted into the second guide units 234b, respectively (see FIG. 1).

Second guide rods 240 extend through the second through-holes 234a of the coupling blocks 234, respectively, in order to induce more stable upward/downward movements. Upper ends of the second guide rods 240 are fixed to the cover plate 150 of the installation body 100, and lower ends thereof are fixed to respective fixing pieces 124.

Therefore, the coupling between the first and second guide units 117 and 234b prevents vibration, and the like. during later upward/downward movements of the transfer block unit 230.

For reference, the structure of the first guide units 117 and the structure of the second guide units 234b can be switched. That is, the first guide units can be realized as recesses, and the second guide units as sticks. It is also possible to omit the first and second guide units 117 and 234b as long as the second guide rods 240 alone can prevent vibration of the driving block unit 250.

The coupling blocks 234 include engagement latches 234c formed on bottom surfaces of their front ends so as to be dented backwards, respectively.

Figure 5:
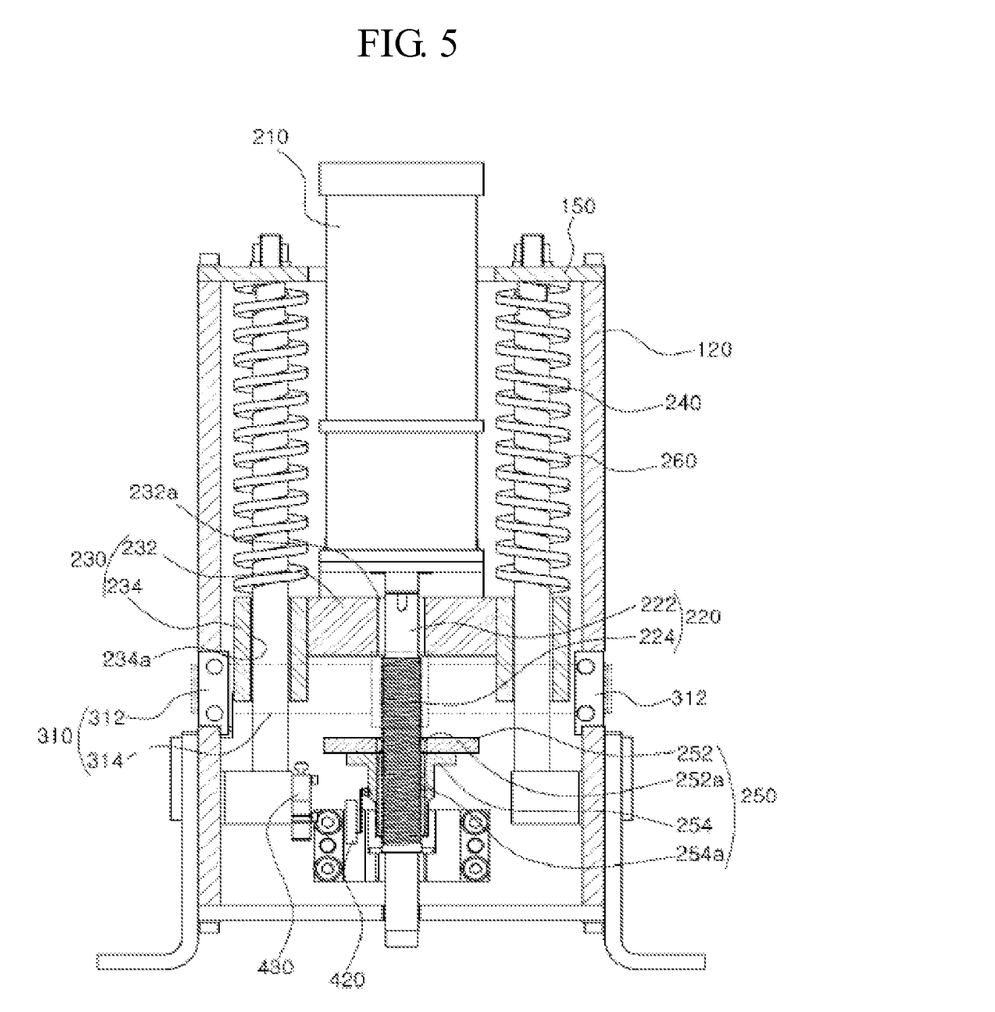
FIG. 5 is a front sectional view illustrating the installation structure of a driving block unit and a transfer block unit under the condition of FIG. 4.
Figure 6:
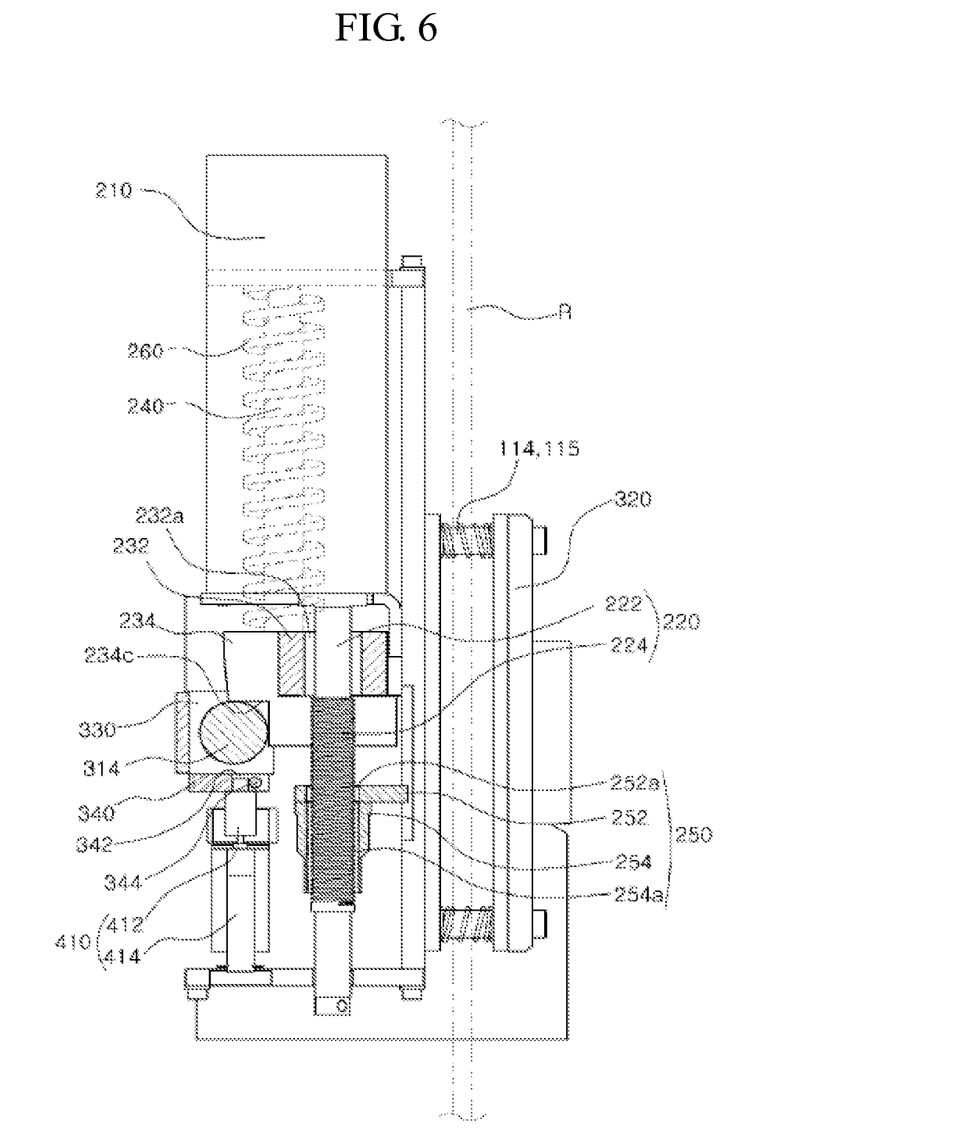
FIG. 6 is a lateral sectional view illustrating a structure of coupling between coupling blocks and a connection rod under the condition of FIG. 5.

The driving block unit 250, which is another component of the driving unit 200, is configured to transfer the transfer block unit 230 and, as illustrated in FIGS. 5 and 6, includes a transfer plate 252, which is shaped as a simple plate member, and a fastening tube 254 integrally formed beneath the transfer plate 252.

The transfer plate 252 has a third through-hole 252a formed with a diameter larger than that of the threaded portion 224 of the lead screw 220 and a guide protrusion 252b formed on the back side. The fastening tube 254 has a screw hole 254a formed along the same line with the third through-hole 252a.

The driving block unit 250 is installed on the threaded portion 224 of the lead screw 220 based on the following installation structure. The threaded portion 224 of the lead screw 220 extends through the third through-hole 252a and the screw hole 254a and is screw-coupled to the screw hole 254a, and the guide protrusion 252b of the transfer plate 252 is fitted to the transfer rail 119 of the installation body 100.

The elastic members 260, which are the remaining components of the driving unit 200, are configured to substantially generate pressure applied to the wire rope, and generally have the shape of coil springs. The elastic members 260 are installed so as to surround respective second guide rods 240, with upper ends of the elastic members 260 forced against the cover plate 150 and lower ends thereof seated on upper surfaces of respective coupling blocks 234.

For reference, the elastic members 260 can also consist of blocks having sufficient elastic force, besides the coil spring structure.

A pressurization unit 300 is further installed on the installation body 100, on which the driving unit 200 has been installed as described above.

The pressurization unit 300 has the substantial braking function and includes a movable unit 310 and a pressurization plate 320.

The movable unit 310 is configured to deliver elastic force from the elastic members 260 to the pressurization plate 320 (described later), and includes movable panels 312 and a connection rod 314.

The movable panels 312 serve as operation levers of the pressurization unit 300 and have the shape of simple plate members. The moveable panels 312 are fitted into the slide recesses 122 of respective lateral plates 120 and are configured to move along a straight line forwards/backwards along the longitudinal direction of the slide recesses 122.

Installation holes 312a are formed on front ends of the movable panels 312, respectively, in order to install the connection rod 314 (described later), and bearings B are installed in the installation holes 312a.

Furthermore, front ends of both movable panels 312 are connected via a separate connection plate 316 so that the movable panels 312 move together forwards/backwards.

The connection rod 314, which is installed on the movable panels 312, is configured to deliver elastic force from the elastic members 260 to respective movable panels 312, and has the shape of a simple circular rod. The connection rod 314 is positioned between respective movable panels 312, with both ends fitted into respective bearings B, so that it can rotate on its own inside the bearings B.

In this case, the engagement latches 234c of the coupling blocks 234 surround partial sections of the circumference of the connection rod 314, so that front ends of respective coupling blocks 234 are placed on the upper end of the connection rod 314.

The pressurization plate 320, which is another component of the pressurization unit 300, is the substantial component of the pressurization unit 300 in charge of pressurizing the wire rope R, and has the shape of a simple plate member. With both sides coupled to rear ends of respective movable panels 312, the pressurization plate 320 is positioned to face the rear plate 110 of the installation body 100 while maintaining a distance.

The pressurization plate 320 has a second seating recess 320a formed on a surface, which faces the rear plate 110, to have a symmetrical structure with regard to the first seating recess 112 of the rear plate 110. Coupling holes 320b are formed near respective corners of the pressurization plate 320, and the ends of the first guide rods 114 of the installation body 100 are fitted into respective coupling holes 320b.

The pressurization unit 300 is further provided with a fixing block 330 to be coupled to the movement control unit 400 (described later) and limit the movement of the pressurization unit 300.

The fixing block 330, while being positioned at an intermediate location of the connection rod 314, is positioned on the connection rod 314 as the connection rod 314 extends through both sides of the fixing block 330, and is coupled to the connection plate 316 in this state so that the position is fixed.

A control block 340 is installed on the bottom of the fixing block 330 to provide substantial connection with the movement control unit 400.

The control block 340 has the shape of a simple plate member; a cut-away recess 342 is formed at an intermediate location of the rear end of the control block 340; and an engagement pin 344 is fitted into the rear portion of the cut-away recess 342.

A movement control unit 400 is further installed on the installation body 100, on which the pressurization unit 300 has been installed as described above.

The movement control unit 400 is configured to control the movement of the pressurization unit 300 and thus to control whether or not to pressurize the rope, and includes a solenoid unit 410, a first position detection sensor 420, and a second position detection sensor 430.

The solenoid unit 410 is configured for substantial control of operation of the pressurization unit 300, and has a conventional solenoid structure, i.e. a solenoid shaft 414 is connected to a solenoid body 412 and is moved forwards/backwards in response to electric signals.

The solenoid unit 410 is installed by positioning it below the control block 340 and fitting the end of the solenoid shaft 414 into the cut-away recess 342 of the control block 340.

In this state, the solenoid body 412 is electrically connected to a separate power unit (not illustrated) so that, as the solenoid shaft 414 moves upwards/downwards in response to electric signals, it can be inserted into and separated from the space between the cut-away recess 342 and the engagement pin 344.

For reference, the cut-away recess 342 of the control block 340 may have the shape of a simple hole, which is enclosed in four directions.

The first position detection sensor 420, which constitutes the movement control unit 400 together with the solenoid unit 410, is configured to detect the position of the pressurization unit 300 during its movement and control whether or not to operate the solenoid unit 410, and a conventional limit switch is used.

The first position detection sensor 420 is installed at a location where the control block 340 is supposed to be positioned when the movable panel 312 has been fully moved backwards, so that the position of the control block 340 can be detected.

To this end, the first position detection sensor 420 is simultaneously connected to the separate power unit and the solenoid unit 410.

The second position detection sensor 430 is configured to detect the state of downward movement of the driving block unit 250, after compression of the elastic members 260, and thereby control whether or not to operate the driving motor 210, and a limit switch structure is also applied in this case.

The second position detection sensor 430 is installed at a location where the driving block unit 250 descends, after pushing up the transfer block unit 230, as much as the length of compression of the elastic members 260, so that the position of the driving block unit 250 can be detected.

To this end, the second position detection sensor 430 is connected to the driving motor 210.

Hereinafter, operations of the present embodiment, the construction of which has been described above, and unique effects occurring in the process will be described.

A process of initially setting the braking apparatus will now be described.

Figure 7:
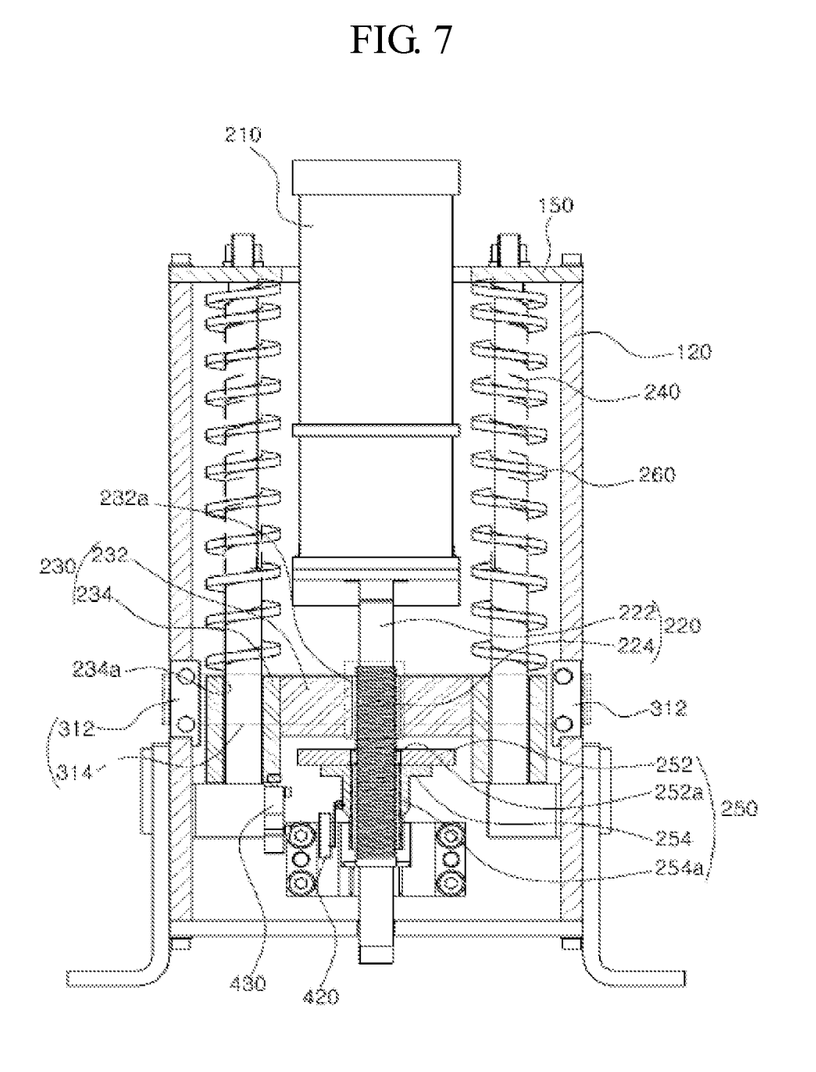
FIGS. 7 and 8 are front and lateral sectional views, respectively, illustrating an initial setting process and a forward movement of a pressurization unit, as a result of disengagement of a solenoid unit, followed by braking of the rope.
Figure 8:
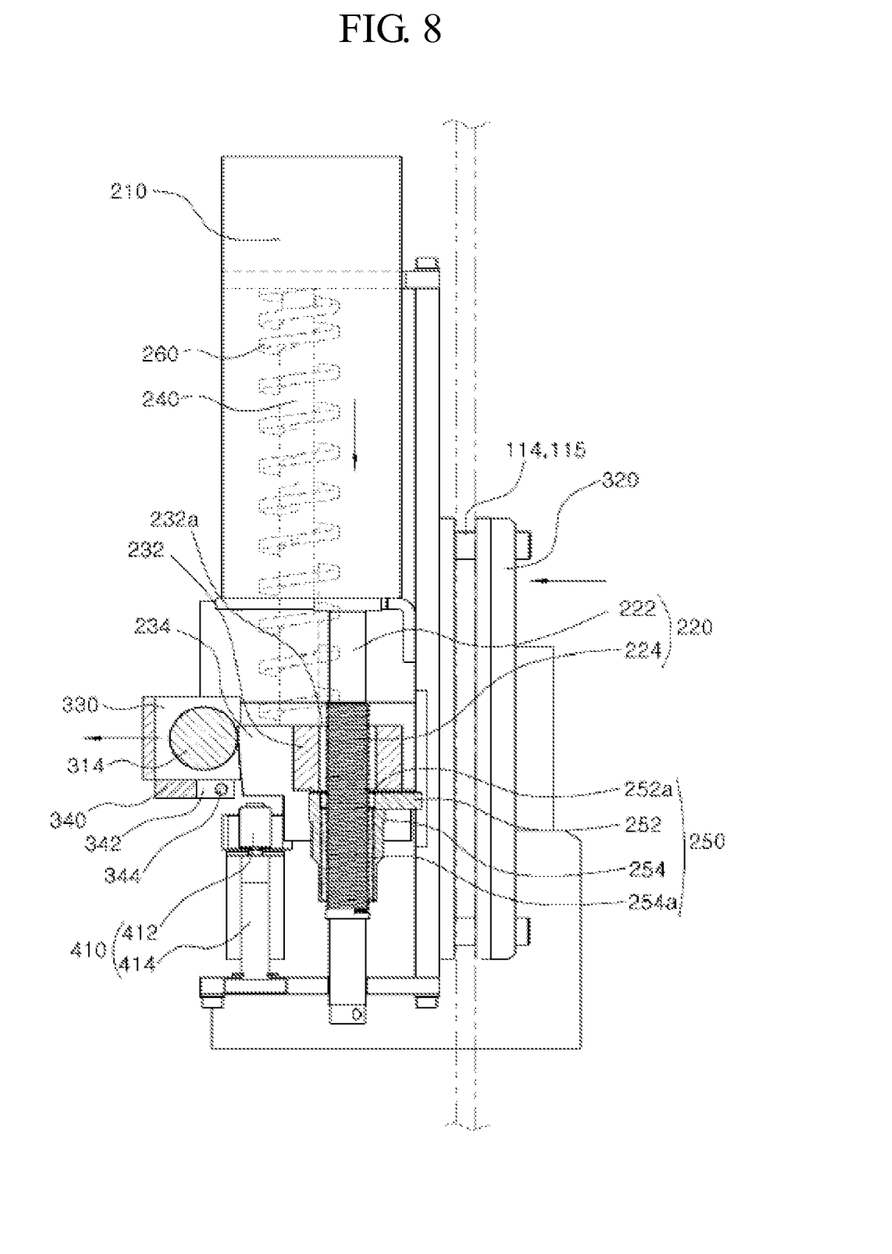
Figure 9:
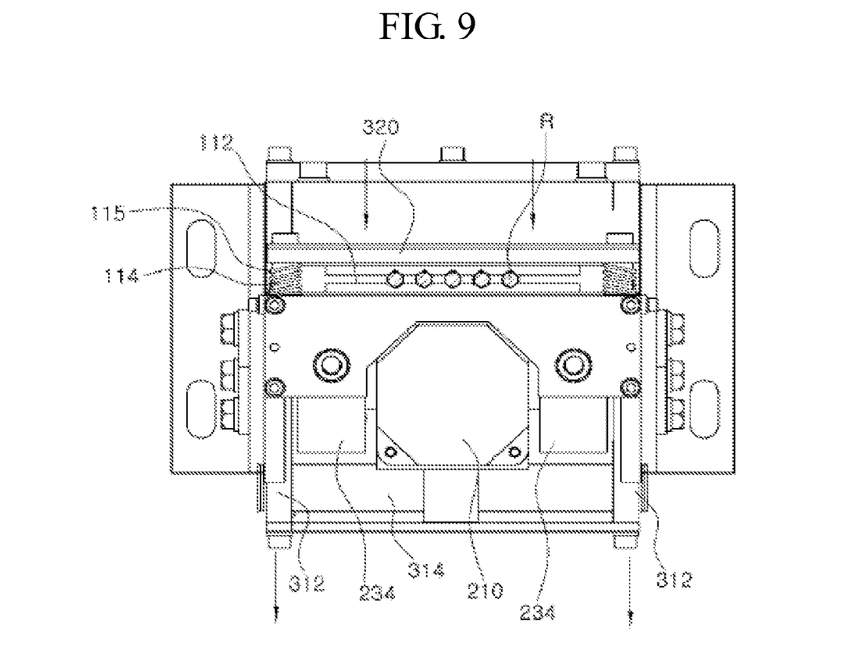
FIG. 9 is a top view under the condition of FIGS. 7 and 8.

FIGS. 7 to 9 illustrate a state prior to initial settings, i.e. when the entire transfer block unit 230 has descended so that the connection block 232 is seated on the upper surface of the transfer plate 252, and when the coupling blocks 234 include pushed the connection rod 314 forwards so that the entire pressurization unit 300 is moved forwards and the pressurization plate 320 is forced against the installation body 100.

Figure 10:
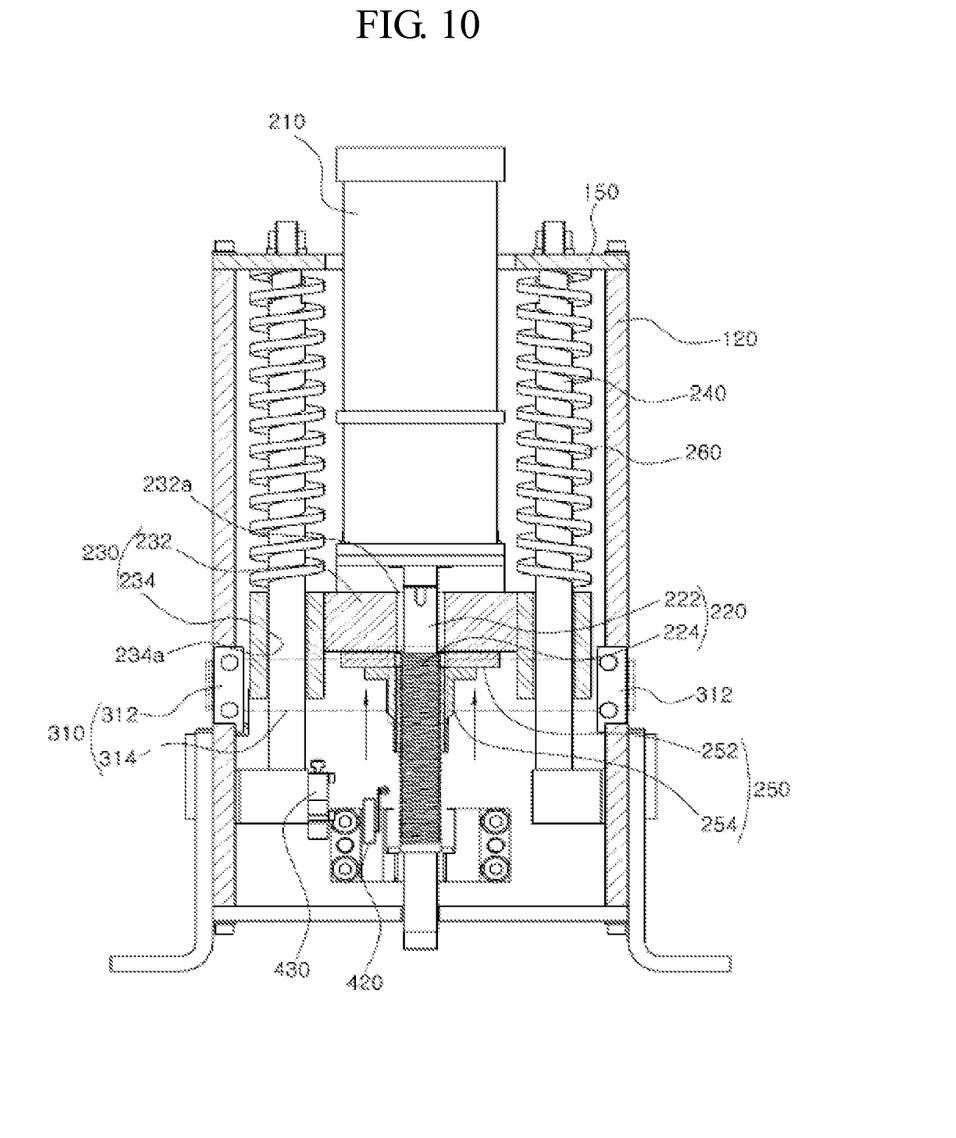
FIGS. 10 and 11 are front and lateral sectional views, respectively, illustrating the operation structure of the pressurization unit, in the process of lifting the transfer block unit by the driving block unit, and a process of compression of compression springs.
Figure 11:
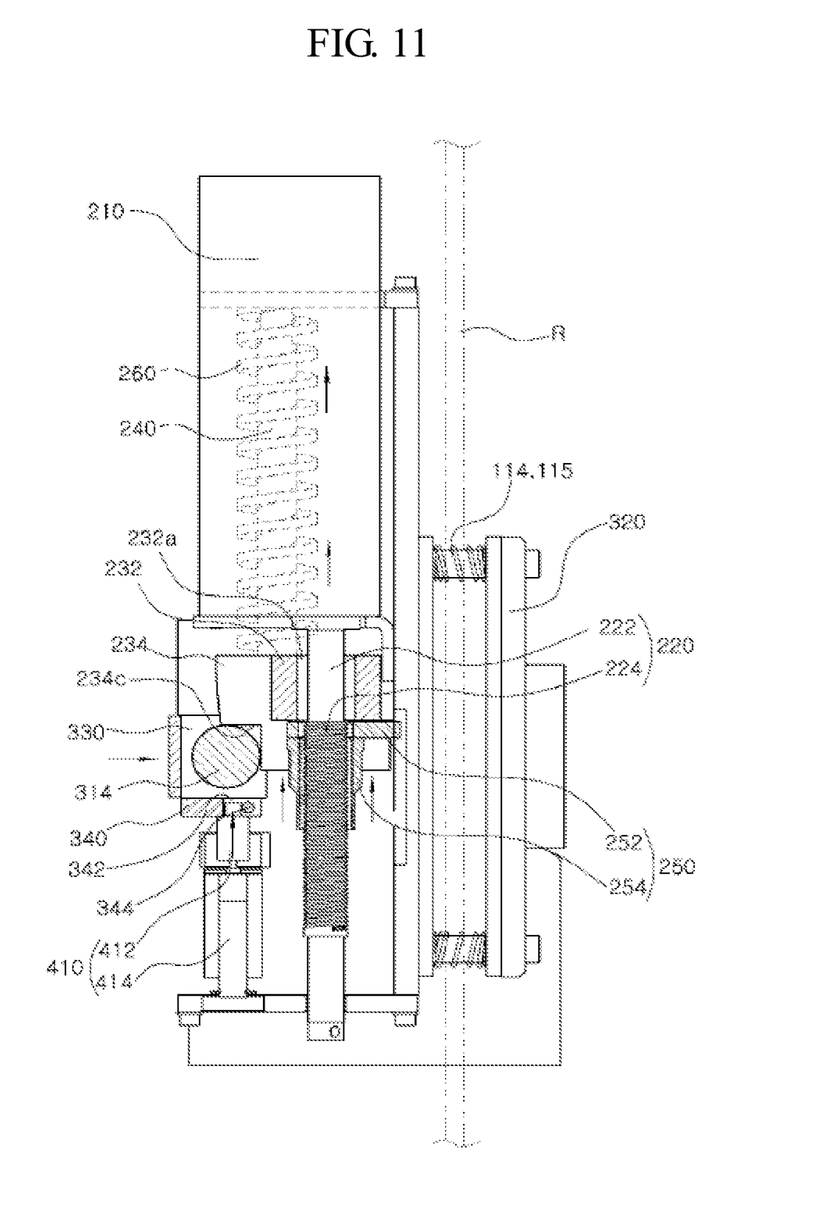

In this state, if the lead screw 220 is rotated by operation of the driving motor 210 as illustrated in FIGS. 10 and 11, the driving block unit 250, which is screw-coupled to it, ascends along the longitudinal direction of the lead screw 220.

In this case, the guide protrusion 252b of the transfer plate 252 is fitted to the transfer rail 118 of the installation body 100, as mentioned above, so that, when the lead screw 220 is rotated, the driving block unit 252 does not rotate together, but moves upwards along a straight line.

Such an upward movement of the driving block unit 250 is followed by an upward movement of the coupling blocks 234, including the connection block 232, and, since the diameter of the first through-hole 232a of the connection block 232 is larger than that of the threaded portion 224 of the lead screw 220, the upward movement is made natural by the driving block unit 250.

The elastic members 260 are compressed as a result of such an upward movement of the coupling blocks 234.

During this process, the moment the contact between the coupling blocks 234 and the connection rod 314 is released, the shock-absorbing springs 115, which have been compressed by the pressurization plate 320, push the pressurization plate 320 backwards. As a result, the movable panels 312 and the connection rod 314 are also moved backwards, so that the connection rod 312 is finally fitted into the engagement latches 234c of the coupling blocks 234.

As a result, ends of respective coupling blocks 234 are placed on the connection rod 314.

If the control block 340 contacts the first position detection sensor 420 while the entire pressurization unit 300 is moving backwards in this manner, the first position detection sensor 420 transmits a power application signal to the power unit. When the solenoid unit 410 receives power from the power unit, the solenoid shaft 414 moves upwards, as illustrated in FIG. 11, and is fitted into the cut-away recess 342 of the control block 340, so that the engagement pin 344 engages with the solenoid shaft 414.

If the lead screw 220 is rotated in the opposite direction by the driving motor 210 in this state, the driving block unit 250 again moves downwards along the longitudinal direction of the lead screw 220, as illustrated in FIGS. 5 and 6. As soon as the driving block unit 250 contacts the second position detection sensor 430 after moving downwards as much as the length of compression of the elastic members 260, the driving motor 210 stops, thereby preventing further downward movement of the driving block unit 250.

In line with such a downward movement of the driving block unit 250, which has been supporting the transfer block unit 230, the elastic force from the elastic members 260, i.e. expansion force, causes a downward movement of the coupling blocks 234. At the same time, the connection rod 314 is forced to move forwards by the coupling blocks 234.

However, the engagement pin 344 of the control block 340 remains engaged with the solenoid shaft 414, as described above, and prevents any forward movement of the entire pressurization unit 300, including the connection rod 314, as well as any downward movement of the coupling blocks 234.

A braking process will now be described.

When an elevator or any other object tied to the wire rope is carried while pressurization of the rope is released, as illustrated in FIGS. 5 and 6, the wire rope R moves upwards/downwards between the pressurization plate 320 and the installation body 100.

In this state, if there is a need to stop the upward/downward movement of the elevator or any other object tied to the wire rope and carried, power supply to the solenoid unit 410 from the power unit is interrupted. The solenoid shaft 414 then moves downwards, as illustrated in FIGS. 7 and 8, and disengages from the engagement pin 344. At the same time, elastic force from the elastic members 260 moves the entire pressurization unit 300 forwards.

This process will now be described in more detail. The connection rod 314 is installed to be rotatable on its own so that, in the process of delivering force of downward movement of the coupling blocks 234, which results from elastic force from the elastic members 260, to the connection rod 314, the connection rod 314 is rotated, causing the ends of the coupling blocks 234 to slide on the connection rod 314 and disengage from the connection rod 314.

As such, the coupling blocks 234 move downwards, and their ends push the connection rod 314 forwards, so that the movable panels 312, which are connected to the connection rod 314, also move forwards along a straight line along the slide recesses 122 of the installation body 100.

Such a forward movement of the movable panels 312 pulls the pressurization plate 320, which is connected to them, forwards, as illustrated in FIGS. 8 and 9, so that the pressurization plate 320 is forced against the rear plate 110 of the installation body 100. At the same time, the pressurization plate 320 pressurizes the wire rope R, which then stops moving, thereby suspending any upward/downward movement of the elevator or other object tied to the wire rope and carried.

As such, according to the present invention, the movable panels 312 move along a straight line so that the pressurization plate 320 also moves along a straight line and pressurizes the wire rope R. Therefore, the moment the wire rope R is pressurized, uniform pressure is applied across the entire pressurization plate 320, thereby guaranteeing stable braking.

In addition, the fact that the entire surface of the pressurization plate 320 simultaneously contacts the wire rope as a result of such a straight movement prevents uneven wear of the wire rope.

The coupling blocks 234 and the connection block 232, which have moved downwards in this manner, are seated on the transfer plate 252 as soon as the elastic members 260 are completely expanded.

When pressurization of the wire rope R needs to be released later, the above-mentioned initial setting process is followed.

As described above, the present invention is most conspicuously characterized in that braking is accomplished solely by elastic force from elastic members, without using any hydraulic or pneumatic structure, thereby preventing degradation of braking force resulting from leakage of a fluid. Furthermore, the structure of the pressurization unit 300 itself and the structure of connection with the driving unit 200 are improved so that the pressurization plate 320 moves along a straight line during a braking process, thereby guaranteeing stable braking and preventing uneven wear of the wire rope.

Although preferred embodiments of the present invention have been described in detail, the scope of the present invention is not limited thereto, and various modifications and improvements made by those skilled in the art using basic concepts defined by the following claims also fall within the scope of the present invention.

In addition, the rope braking apparatus according to the present invention is widely applicable not only to elevators, but also to hoists, cranes, and the like, which are used to lift/lower objects tied to the wire rope.

The invention claimed is:

1. A rope braking apparatus comprising:
   an installation body comprising a wire rope positioned on a back surface of the installation body, the wire rope being connected to a lifted/lowered object;
   a driving unit comprising a driving motor installed on the installation body, a transfer block unit installed to be movable upwards/downwards while being connected to the driving motor, and elastic members installed on the transfer block unit;
   a pressurization unit comprising a movable unit installed on the installation body so as to be movable forwards/backwards along a straight line while contacting the transfer block unit and a pressurization plate positioned to face the installation body, with the wire rope interposed, while being connected to the movable unit; and
   a movement control unit configured to control a movement of the pressurization unit and including a solenoid unit.

2. The rope braking apparatus of claim 1, wherein the driving unit further comprises:
   a lead screw connected to the driving motor, the leading screw having a non-threaded portion formed on an upper end and a threaded portion formed in a section below the non-threaded portion; and
   a driving block unit screw-coupled on the threaded portion of the lead screw so as to be movable upwards/downwards while being positioned below the transfer block unit.

3. The rope braking apparatus of claim 2, wherein the transfer block unit comprises:
   a connection block movable upwards/downwards without contacting the lead screw while being penetrated by the lead screw; and
   coupling blocks connected to both sides of the connection block, the elastic members being seated on the coupling blocks, and ends of the coupling blocks being placed on the movable unit.

4. The rope braking apparatus of claim 3, further comprising:
   a first guide unit formed on at least one of the connection block and the coupling blocks; and
   a second guide unit formed on the installation body and connected to the first guide unit, the second guide unit being formed along a direction of upward/downward movement of the transfer block unit.

5. The rope braking apparatus of claim 3, wherein slide recesses are formed on both sides of the installation body along a forward/backward straight line, and the movable unit comprises:
movable panels installed to be movable along the forward/backward straight line along slide recess paths while being installed in the slide recesses, an end of each movable panel being connected to the pressurization plate; and
a connection rod positioned between respective movable panels, both ends of the connection rod being connected to respective movable panels, and the ends of the coupling blocks being placed on the connection rod.

6. The rope braking apparatus of claim 5, wherein the connection rod is connected to the movable panels so as to be rotatable by itself, and engagement latches are formed on the ends of the coupling blocks so as to surround a circumference of the connection rod.

7. The rope braking apparatus of claim 5, wherein the pressurization unit further comprises a fixing block installed on the connection rod and removably connected to the movement control unit.

8. The rope braking apparatus of claim 7, wherein the pressurization unit further comprises a control block installed on the fixing block, a cut-away portion being formed on a side of the control block so that the control block is removably coupled to the solenoid unit through the cut-away portion.

9. The rope braking apparatus of claim 8, wherein the movement control unit comprises:
a solenoid body positioned beneath the connection rod; and
a solenoid shaft installed to be movable upwards/downwards while being connected to the solenoid body, an end of the solenoid shaft being removably inserted into the cut-away portion.

10. The rope braking apparatus of claim 9, wherein the movement control unit further comprises a position detection sensor connected to the solenoid body and configured to detect a completed movement of the movable unit towards the pressurization plate.

11. The rope braking apparatus of claim 9, wherein the movement control unit further comprises a second position detection sensor connected to the driving motor and installed at a descending location of the driving block unit to detect a descending state of the driving block unit.

* * * * *